United States Patent
Diaz et al.

(10) Patent No.: US 9,429,072 B2
(45) Date of Patent: Aug. 30, 2016

(54) RETURN FLUID AIR COOLER SYSTEM FOR TURBINE COOLING WITH OPTIONAL POWER EXTRACTION

(71) Applicant: GENERAL ELECTRIC COMPANY, Schenectady, NY (US)

(72) Inventors: Carlos Enrique Diaz, Munich (DE); Jorge Alejandro Carretero Benignos, Munich (DE)

(73) Assignee: General Electric Company, Niskayuna, NY (US)

(*) Notice: Subject to any disclaimer, the term of this patent is extended or adjusted under 35 U.S.C. 154(b) by 465 days.

(21) Appl. No.: 13/900,189

(22) Filed: May 22, 2013

(65) Prior Publication Data

US 2014/0345292 A1 Nov. 27, 2014

(51) Int. Cl.
*B64D 15/00* (2006.01)
*F02C 7/18* (2006.01)
*F02C 7/047* (2006.01)

(52) U.S. Cl.
CPC .......... *F02C 7/047* (2013.01); *F05D 2260/213* (2013.01); *Y02T 50/676* (2013.01)

(58) Field of Classification Search
CPC .......... F02C 7/047; F02C 6/08; F02C 7/185; F02C 7/14; F02C 7/224; F05D 2260/213; Y02T 50/676
See application file for complete search history.

(56) References Cited

U.S. PATENT DOCUMENTS

| | | | |
|---|---|---|---|
| 2,623,721 A * | 12/1952 | Harrington | 244/135 R |
| 3,420,055 A * | 1/1969 | Lavash | 60/39.281 |
| 3,651,645 A * | 3/1972 | Grieb | 60/262 |
| 4,012,012 A * | 3/1977 | Ligler | 244/1 R |
| 4,120,150 A | 10/1978 | Wakeman | |
| 4,137,705 A | 2/1979 | Andersen et al. | |
| 4,254,618 A | 3/1981 | Elovic | |
| 4,263,786 A | 4/1981 | Eng | |
| 4,696,156 A * | 9/1987 | Burr et al. | 60/39.08 |
| 4,773,212 A * | 9/1988 | Griffin et al. | 60/772 |
| 4,966,005 A | 10/1990 | Cowell et al. | |
| 5,121,598 A * | 6/1992 | Butler | 60/39.08 |
| 5,152,146 A * | 10/1992 | Butler | 60/736 |
| 5,177,951 A * | 1/1993 | Butler | 60/772 |
| 5,203,163 A | 4/1993 | Parsons | |
| 5,241,814 A * | 9/1993 | Butler | 60/39.08 |
| 5,255,505 A | 10/1993 | Cloyd et al. | |
| 5,317,877 A | 6/1994 | Stuart | |
| 5,392,614 A | 2/1995 | Coffinberry | |
| 5,414,992 A | 5/1995 | Glickstein | |
| 5,511,374 A | 4/1996 | Glickstein et al. | |
| 5,544,700 A | 8/1996 | Shagoury | |

(Continued)

FOREIGN PATENT DOCUMENTS

WO 9703281 A1 1/1997

OTHER PUBLICATIONS

K. Krithivasan, "Detection of propagation of over-heat sections in supply air duct of aircrafts," Honeywell Technology Solutions Lab Pvt. Ltd., pp. 1-6, Dec. 6, 2011.

*Primary Examiner* — Carlos A Rivera
(74) *Attorney, Agent, or Firm* — John P. Darling (57) ABSTRACT

In an aircraft including a gas turbine engine, a system for cooling the gas turbine engine includes a tank provided in a wing of the aircraft, the tank being configured to store a cooling fluid supply; and a heat exchanger provided in the gas turbine engine configured to exchange heat from the compressor discharge air to the cooling fluid.

16 Claims, 9 Drawing Sheets

(56) References Cited

U.S. PATENT DOCUMENTS

| | | | |
|---|---|---|---|
| 5,553,449 A * | 9/1996 | Rodgers et al. | 60/204 |
| 5,558,303 A * | 9/1996 | Koethe et al. | 244/134 R |
| 5,615,547 A * | 4/1997 | Beutin et al. | 60/39.08 |
| 5,918,458 A | 7/1999 | Coffinberry et al. | |
| 6,182,458 B1 | 2/2001 | Franklin, Jr. | |
| 6,415,595 B1 | 7/2002 | Wilmot, Jr. et al. | |
| 6,584,778 B1 | 7/2003 | Griffiths et al. | |
| 6,993,913 B2 * | 2/2006 | Kobayashi et al. | 60/736 |
| 7,000,404 B2 | 2/2006 | Palmisano et al. | |
| 7,143,581 B2 * | 12/2006 | Kobayashi et al. | 60/728 |
| 7,231,769 B2 | 6/2007 | Spadaccini et al. | |
| 7,716,913 B2 * | 5/2010 | Rolt | 60/266 |
| 2008/0310955 A1 | 12/2008 | Norris | |
| 2008/0314573 A1 | 12/2008 | Schwarz et al. | |
| 2009/0175718 A1 | 7/2009 | Diaz | |
| 2009/0211273 A1 | 8/2009 | Kiewer | |
| 2010/0212857 A1 * | 8/2010 | Bulin et al. | 165/41 |
| 2011/0079683 A1 * | 4/2011 | Stolte et al. | 244/129.2 |
| 2011/0302928 A1 | 12/2011 | Mudawar | |
| 2011/0314835 A1 | 12/2011 | Liu | |
| 2012/0067055 A1 * | 3/2012 | Held | 60/772 |
| 2012/0192578 A1 | 8/2012 | Finney | |
| 2013/0195658 A1 * | 8/2013 | Saito et al. | 416/39 |
| 2014/0352315 A1 * | 12/2014 | Diaz | 60/772 |

* cited by examiner

RETURN FLUID AIR COOLER SYSTEM FOR TURBINE COOLING WITH OPTIONAL POWER EXTRACTION

BACKGROUND OF THE TECHNOLOGY

The present technology relates generally to a cooling system and method for a gas turbine engine and, in particular, to a system and method of cooling a hot portion of a gas turbine engine.

Gas turbine engines (such as turbojet engines, bypass turbofan engines, turboprop engines, turboshaft engines, etc.) may be used to power flight vehicles (such as planes, helicopters, and missiles, etc.) and may also be used to power ships tanks, electric power generators, pipeline pumping apparatus, etc. For purposes of illustration, the present technology will be described with respect to an aircraft bypass turbofan gas turbine engine. However, it is understood that the present technology is equally applicable to other types and/or uses of gas turbine engines.

Figure 9:
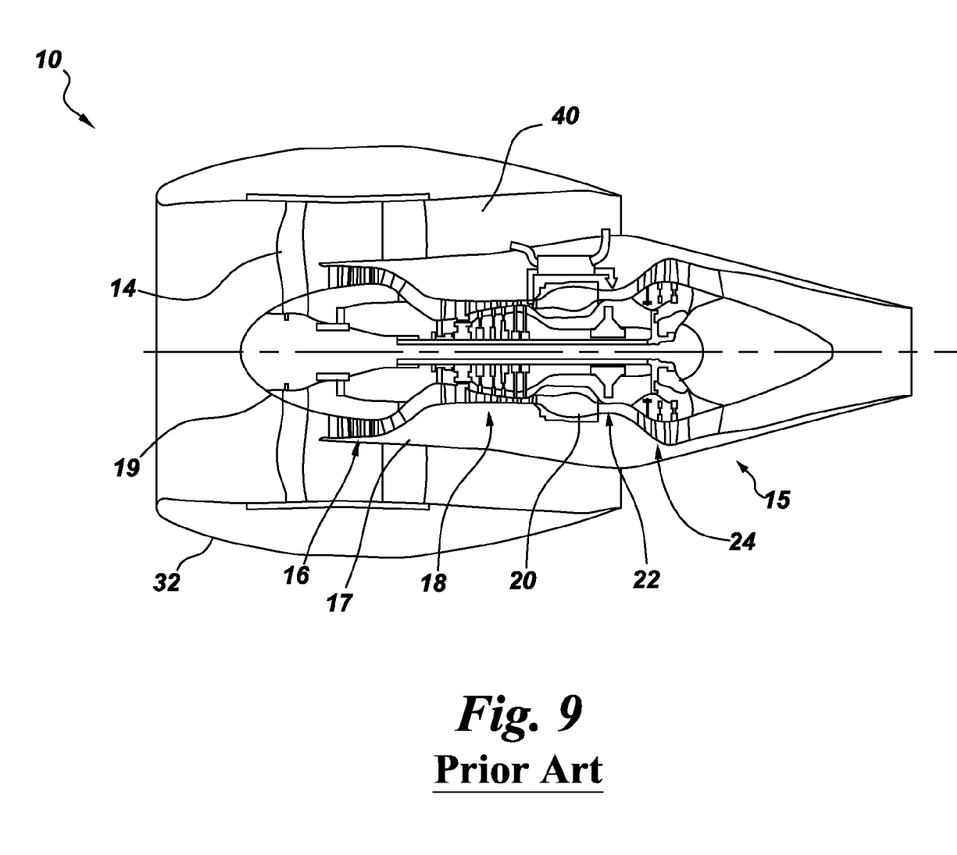
FIG. 9 is a cross-sectional illustration of a conventional gas turbine engine assembly.

Referring to FIG. 9, a gas turbine engine assembly 10 includes a core engine 15 having, in serial flow relationship, a high pressure compressor 18 (also called a core compressor) to compress the airflow entering the core engine 15, a combustor 20 (also called a combustion chamber) in which a mixture of fuel and the compressed air is burned to generate a propulsive gas flow, and a high pressure turbine 22 which is rotated by the propulsive gas flow and which is connected by a larger diameter shaft to drive the high pressure compressor 18. A typical aircraft bypass gas turbine engine adds a low pressure turbine 24 (located aft of the high pressure turbine) which is connected by a smaller diameter coaxial shaft to drive a front fan 14 (located forward of the high pressure compressor) which is surrounded by a nacelle 32 and which may also drive a low pressure compressor 16 (located between the front fan 14 and the high pressure compressor 18). The low pressure compressor 16 sometimes is called a booster compressor or simply a booster. It is understood that the term "compressor" includes, without limitation, high pressure compressors and low pressure compressors. A flow splitter 17, located between the fan 14 and the first (usually the low pressure) compressor, separates the air which exits the fan 14 into a core engine airflow and a surrounding bypass airflow. The bypass airflow from the fan exits the fan bypass duct 40 to provide most of the engine thrust for the aircraft. Some of the engine thrust comes from the core engine airflow after it flows through the low and high pressure compressors 16, 18 to the combustor 20 and is expanded through the high and low pressure turbines 22, 24 and accelerated out of the exhaust nozzle.

Aircraft bypass turbofan gas turbine engines are designed to operate at high temperatures to maximize engine thrust. Cooling of engine hot section components (such as the combustor, the high pressure turbine, the low pressure turbine, and the like) is necessary because of the thermal "redline" limitations of the materials used in the construction of such components. Typically, such cooling of a portion of the engine is accomplished by ducting (also called "bleeding") cooler air from the high and/or low pressure compressors to those engine components which require such cooling. Unfortunately, the relatively low pressure and hot temperature of the compressor air limits its ability to be used to cool such engine components.

In service, gas turbine aircraft engines are subject to a wide range of operating conditions such as high and low altitudes, high and low temperatures, and high and low speed airflows over, around, and through the engine. Even during a single flight, the aircraft, its engine(s), and engine control components may experience low speed, low altitude, and high temperature conditions during taxi, takeoff, and landing operations, as well as high speed, high altitude, and low temperature conditions during the cruise portion of the flight.

To manage the operating temperatures of the engine components, ventilation is often provided to direct air which is cooler than the components onto the components to carry heat away and maintain the temperature of the component at a satisfactory operating level. However, cooling needs often vary greatly during the course of a flight or operating session. For example, a much greater degree of cooling may be needed on a hot day during ground operations at engine idle power settings than at high altitude during cruise conditions and high power settings.

The technology described herein relates generally to gas turbine engines, and more particularly, to a system and method for cooling engine control components for such engines.

BRIEF DESCRIPTION OF THE TECHNOLOGY

In one example of the present technology, in an aircraft including a gas turbine engine, a system for cooling the gas turbine engine comprises a tank provided in a wing of the aircraft, the tank being configured to store a cooling fluid supply; and a heat exchanger provided in the gas turbine engine configured to exchange heat from the compressor discharge air to the cooling fluid.

In another example of the present technology, a method of cooling compressor discharge air provided to a gas turbine engine of an aircraft to cool the turbine or other hot parts of the gas turbine engine comprises providing cooling fluid from a tank provided in a wing of the aircraft; and exchanging heat from the compressor discharge air to the cooling fluid with a heat exchanger provided in the gas turbine engine.

BRIEF DESCRIPTION OF THE DRAWINGS

Examples of the present technology will be described with regard to the accompanying drawing figures, in which like numerals refer to like elements throughout the drawing figures, wherein.

DETAILED DESCRIPTION OF THE TECHNOLOGY

Figure 1:
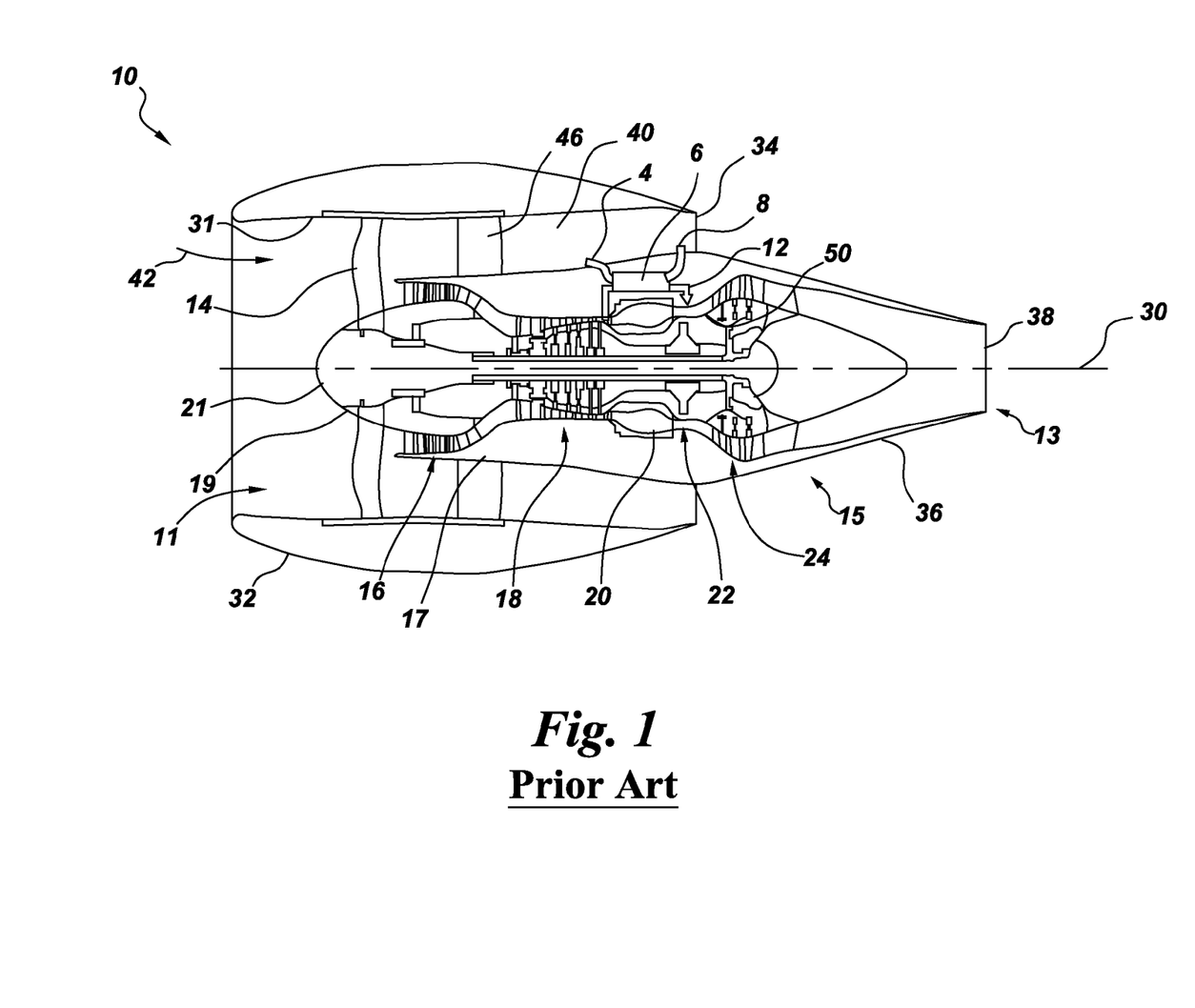
FIG. 1 is a cross-sectional illustration of a turbine engine with a conventional cooled cooling air assembly.

FIG. 1 is a cross-sectional schematic illustration of a gas turbine engine with conventional cool cooling air by means of an air/air heat exchanger assembly 10 having a longitudinal axis 30. The gas turbine engine assembly 10 includes a fan assembly 14 and a core gas turbine engine 15. The core gas turbine engine 15 includes a high pressure compressor 18, a combustor 20, and a high pressure turbine 22. The gas turbine engine assembly 10 may further include a low pressure turbine 24, and a multi-stage low pressure, or booster, compressor 16 (also referred to as a booster), and a splitter 17 that substantially circumscribes or encircles the booster 16. The gas turbine engine assembly 10 has an intake side 11 and an exhaust side 13.

The fan assembly 14 includes an array of fan blades extending radially outward from a rotor disk 19, the forward portion of which is enclosed by a streamlined spinner 21. The fan assembly 14, the booster 16, and the low pressure turbine 24 may be coupled together by a first rotor shaft and the high pressure compressor 18 and the high pressure turbine 22 may be coupled together by a second rotor shaft.

In operation, incoming air 42 flows through fan assembly 14 and a first portion of the airflow is channeled through booster 16 and onward through internal flowpath 50 of core gas turbine engine 15. The compressed air that is discharged from booster 16 is channeled through high pressure compressor 18 wherein the airflow is further compressed and delivered to the combustor 20. Hot products of combustion (not shown in FIG. 1) from the combustor 20 drive the high pressure turbine 22 and the low pressure turbine 24, and the low pressure turbine 24 drives the fan assembly 14 and the booster 16 by way of the first rotor shaft. Air and combustion products flowing through internal flowpath 50 exit the core gas turbine engine 15 at the trailing edge 38 of the core cowl 36. The turbine engine assembly 10 may be operable at a range of operating conditions between design operating conditions and off-design operating conditions.

A second portion of the incoming airflow 42 discharged from the fan assembly 14 is channeled through a bypass duct 40 to bypass a portion of the airflow from fan assembly 14 around the core cowl 36 which encloses the core gas turbine engine 15. More specifically, the bypass duct 40 extends between a fan casing or shroud, which forms a first or inner surface 31 of an engine nacelle 32 and the core cowl 36 which has a leading edge formed by the splitter 17. Air flowing through bypass duct 40 exits the trailing edge 34 of the nacelle 32. The nacelle 32 encloses the major portion of the aircraft engine 10 and is secured to the aircraft by appropriate mounting apparatus 2, such as a mounting pylon (FIG. 2).

Accordingly, a first portion of the airflow from fan assembly 14 is channeled through booster 16 and then into the high pressure compressor 18 as described above, and a second portion of the airflow from fan assembly 14 is channeled through the bypass duct 40 to provide thrust for the aircraft. The splitter 17 divides the incoming airflow into the first and second portions. The gas turbine engine assembly 10 also includes a fan frame assembly 46 to provide structural support for fan assembly 14 and is also utilized to couple fan assembly 14 to the core gas turbine engine 15.

The bypass duct 40 may include a scoop 4 configured to direct air from the bypass duct 40 to a heat exchanger 6. The heat exchanger uses the air from the bypass duct 40 to cool air 12 received from a discharge region of the high pressure compressor 18 that is used to first stage of the high pressure turbine 22. It can be used to cool any other hot part, for example the disk of the high pressure compressor. An exhaust 8 is provided to return the cooling air to the bypass duct 40. The provision of the scoop in the bypass duct and the return of the air to the bypass duct through the exhaust typically cause increased drag on the aircraft during cruise conditions. Moreover, the heat is dissipated in the propulsion system and is transferred by air-to-air, which provides poor efficiency, requires large heat exchangers, and adds drag on the aircraft.

Figure 2:
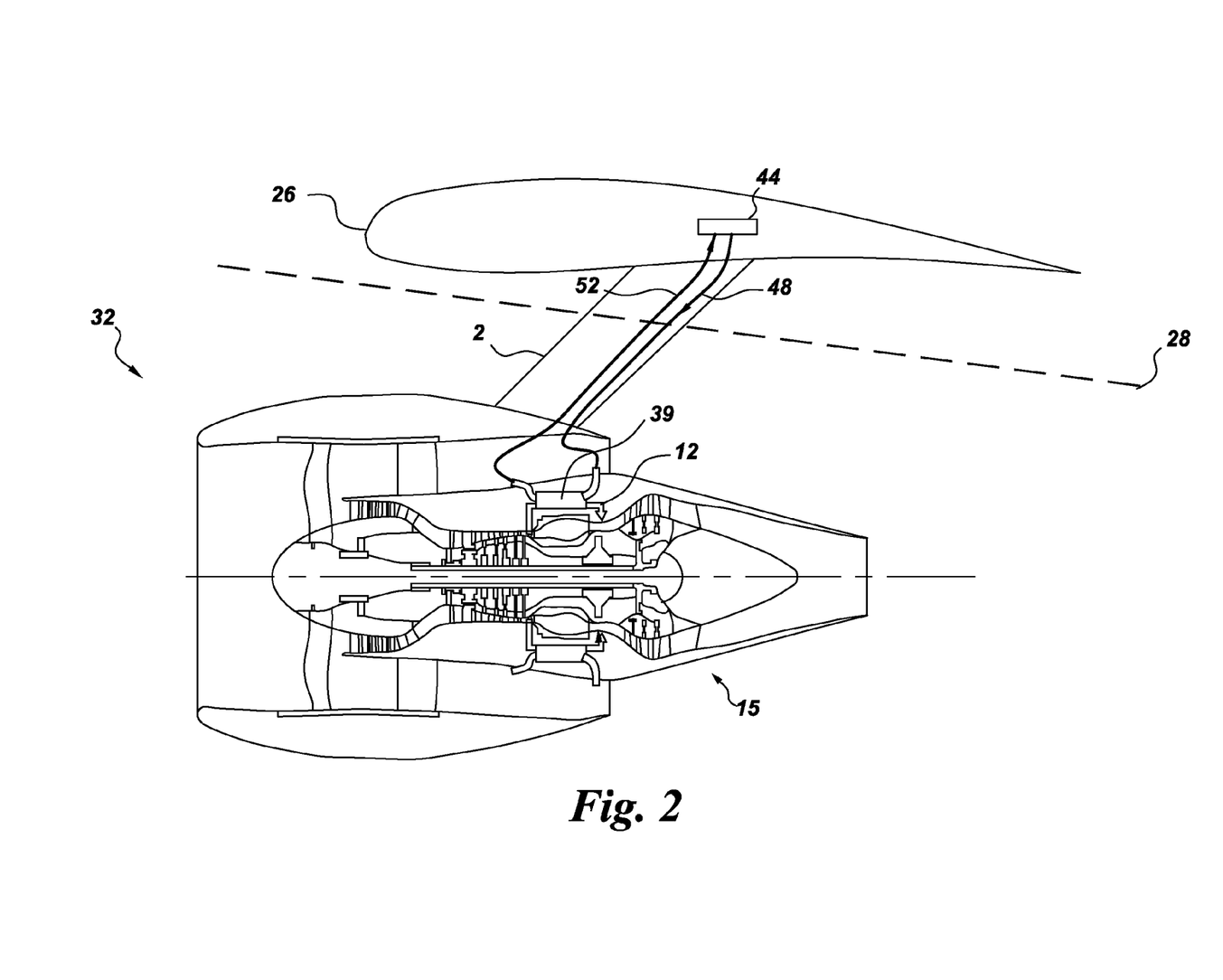
FIG. 2 is a cross-sectional illustration of a return fluid air coller (RFAC) system for a turbine engine according to one example of the present technology.

Referring to FIG. 2, in an example of a return fluid air cooler (RFAC) system according to the present technology, the compressor discharge, or turbine cooling, air 12 is cooled by an auxiliary fluid 48 from an auxiliary fluid source 44 provided in the wing 26 of the aircraft. As used herein the term "fluid" in the context of an auxiliary fluid, or a cooling fluid, or a thermal fluid means a fluid provided in liquid form. The system may include, for example, a pump for delivering the auxiliary fluid 48 to a heat exchanger 39 in which heat from the turbine (or other engine hot parts) cooling air 12 is transferred to the auxiliary fluid 48. The heated auxiliary fluid 52 is return to the auxiliary fluid source 44. It should be appreciated that the auxiliary fluid source 44 may be connected to the heat exchanger by, for example ducts from the source 44 through the pylon 2 to the heat exchanger 39 and from the heat exchanger 39 back to the source 44.

The heat in the heated auxiliary fluid 52 is dissipated by, for example, being used in an anti-ice system as described in more detail below, a condenser(s) in the aircraft wing fuel tank(s), or by direct mixing with fuel in the tanks. The fuel in the aircraft wing 26 is constantly cooled by external air during flight as the wing acts as a large heat exchanger during cruise, at which time the cooled cooling air system may be switched off.

The system shown in FIG. 2 cools the turbine cooling air 12 by fluid-to-air heat exchange, which is more efficient than air-to-air, and which allows the heat exchanger 39 to be smaller than the conventional heat exchanger 6 of FIG. 1. The heat from the cooling system is dissipated inside the aircraft wing, and from there dissipated to the air around the wing. Therefore there is no need for any device to reject the heat from the cooling fluid into the air stream, and thus the air flow around the wing, around the engine nacelle and through the engine is not affected by any additional drag at all. The conventional cool cooling air system included an air scoop, an air duct an air/air heat exchanger and an air outlet that produced drag in the propulsion system. In the present technology, the wing will act as a heat exchanger without any modifications to the external shape of the wing.

The auxiliary fluid may be a fluid other than air, for example fuel, although it should be appreciated that other fluids may be used as discussed in more detail below.

Figure 3:
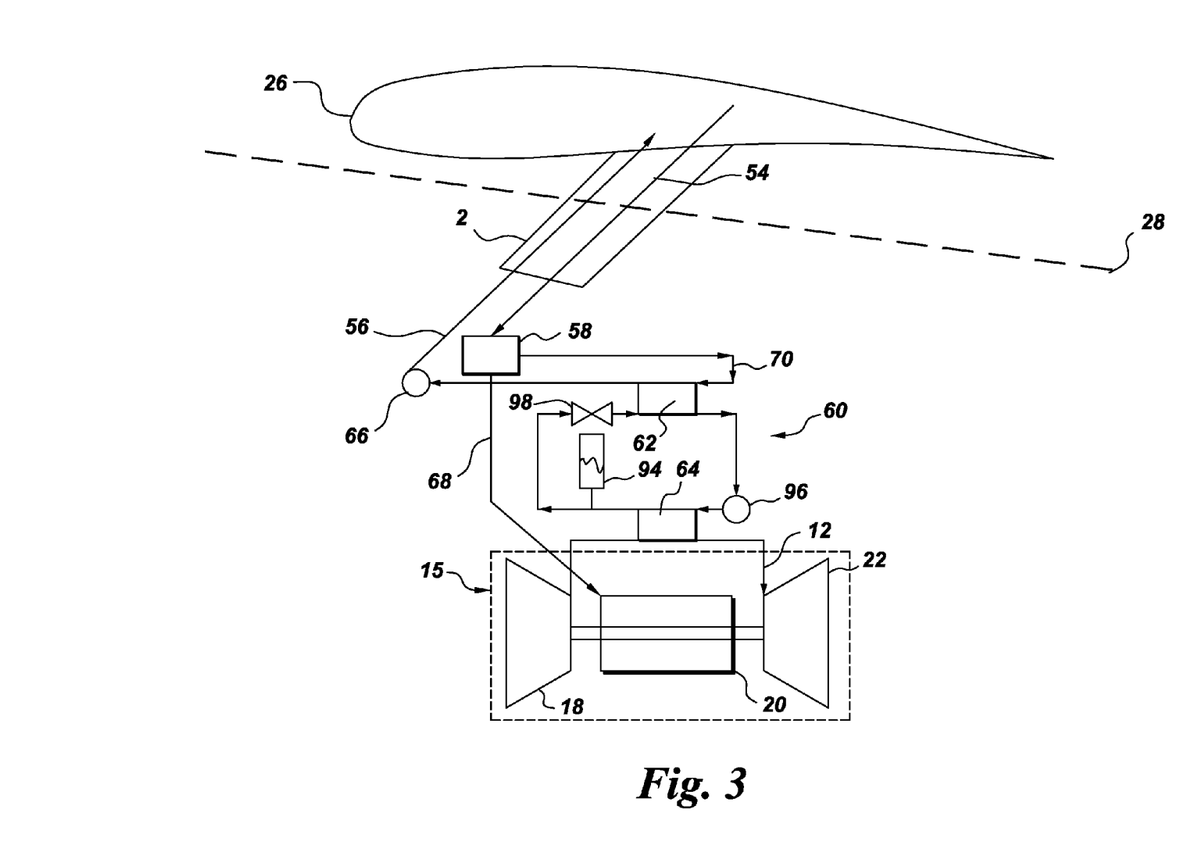
FIG. 3 is a cross-sectional illustration of a RFAC system for a turbine engine according to one example of the present technology.

Referring to FIG. 3, according to another example of the present technology, cold fuel 54 from a fuel tank in the wing 26 of the aircraft is provided to a junction 58 that splits the flow of cold fuel 54 into a flow of fuel 70 that is used to remove heat from an intermediate loop 60 and a flow of fuel 68 to the combustor 20. The intermediate loop 60 includes a first heat exchanger 62 for removing heat from the intermediate loop 60 that is provided by a second heat exchanger 64 that removes heat from the high pressure turbine cooling air 12. An optional pump 66 may be provided to deliver the warm fuel 56 back to the fuel tank in the aircraft wing 26. The intermediate loop 60 reduces or prevents coking of the fuel. The system shown in FIG. 3 may be used, for example, during take-off and climb of the aircraft. The system further may further include an optional pump 96 configured to pump the cooling fluid in the intermediate loop 60. The pump 96 may be turned off after take-off and climb when the aircraft reaches cruise altitude. An expansion bottle 94 may be provided after the second heat exchanger 64 to allow expansion of vapor of the cooling fluid used in the intermediate loop 6. A valve 98 may also be provided to control flow through the first heat exchanger 62 of the intermediate loop 60.

Figure 4:
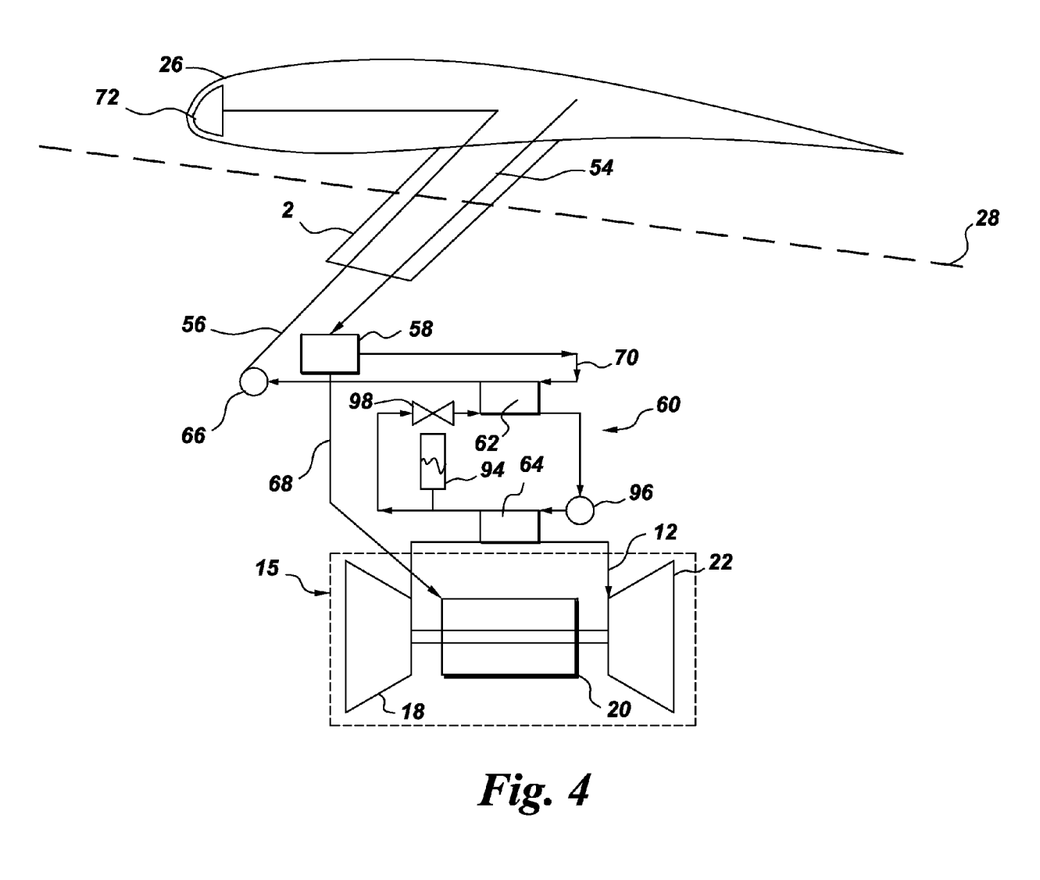
FIG. 4 is a cross-sectional illustration of a RFAC system for a turbine engine according to one example of the present technology.

Referring to FIG. 4, according to another example of the present technology, the warm fuel 56 is returned to a tank in the aircraft wing 26 and is then used in an anti-ice system 72 provided in the wing 26. The warm and pressurized return fuel will be directed against the internal wall of the wing leading edge, and from there it will mix with the cold fuel 54 in the wing 26 of the aircraft. The system may be switched on during take-off and climb for the purpose of providing extra cooling to the cooling air used to decrease the temperature of the hot parts of the engine even if the wing anti-ice system does not need to be switched on. In that case the heat will be dissipated in the leading edge of the wing, where the wing anti-ice system is located but with no need for ice protection. It should also be appreciated that the anti-icing system may be provided to the aerodynamic surfaces of the tail of the aircraft in the case of a tail mounted engine. The system may be switched on at any time that the aircraft finds atmospheric icing conditions. During most of the time at cruise at an altitude higher than 20,000 ft. the aircraft is not in icing conditions, and therefore the system can be switched off with the associated energy savings.

Figure 5:
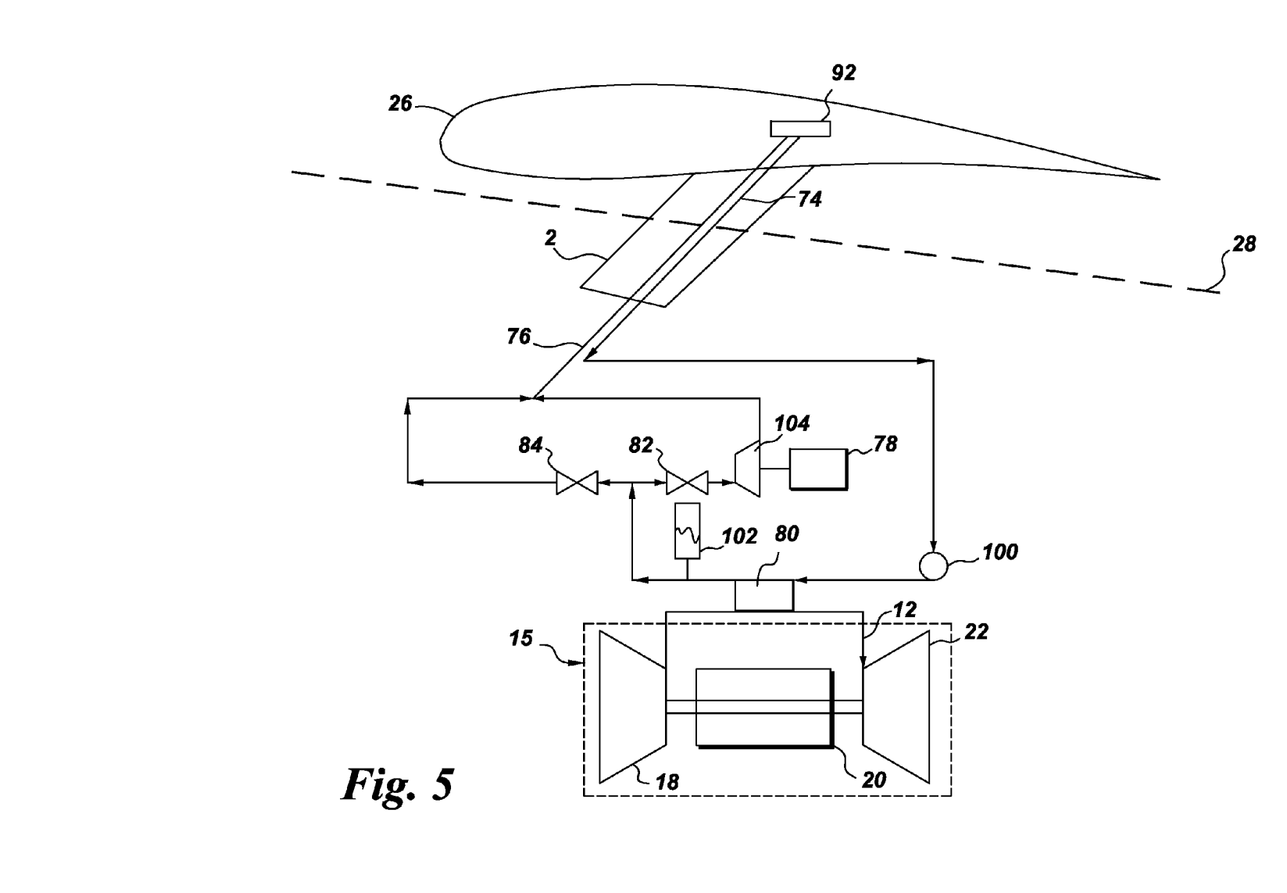
FIG. 5 is a cross-sectional illustration of a RFAC system for a turbine engine according to one example of the present technology.

Referring to FIG. 5, a cold thermal fluid 74 is provided from a tank or source 92 to a heat exchanger 80 configured to cool the high pressure turbine cooling air 12 or any other hot part of the engine (e.g. the high pressure compressor disk). The thermal fluid may be a fluid that undergoes a phase change. The thermal fluid may also be a synthetic fluid. The warm thermal fluid 76 is separated and a first valve 82 provides a portion of the warm fluid 76 to a turbine 104 to extract power from the warm fluid 76 and reduce the enthalpy of the fluid. A second valve 84 returns the remaining portion of the warm fluid 84 to the tank or source 92. A pump 100 is configured to pump the cold fluid 74 during take-off and climb, and may be turned off at cruise altitude. An expansion bottle 102 may be provided after the heat exchanger 80. The turbine 104 may be driven by the portion of the warm fluid 76 through the valve 82 to drive a generator 78. The RFAC system of FIG. 5 reduces the enthalpy of the fluid through the heat exchanger 80 and the extraction of useful work by the generator 78. It should be appreciated that the thermal fluid 74 of the RFAC system may be, for example, water.

Figure 6:
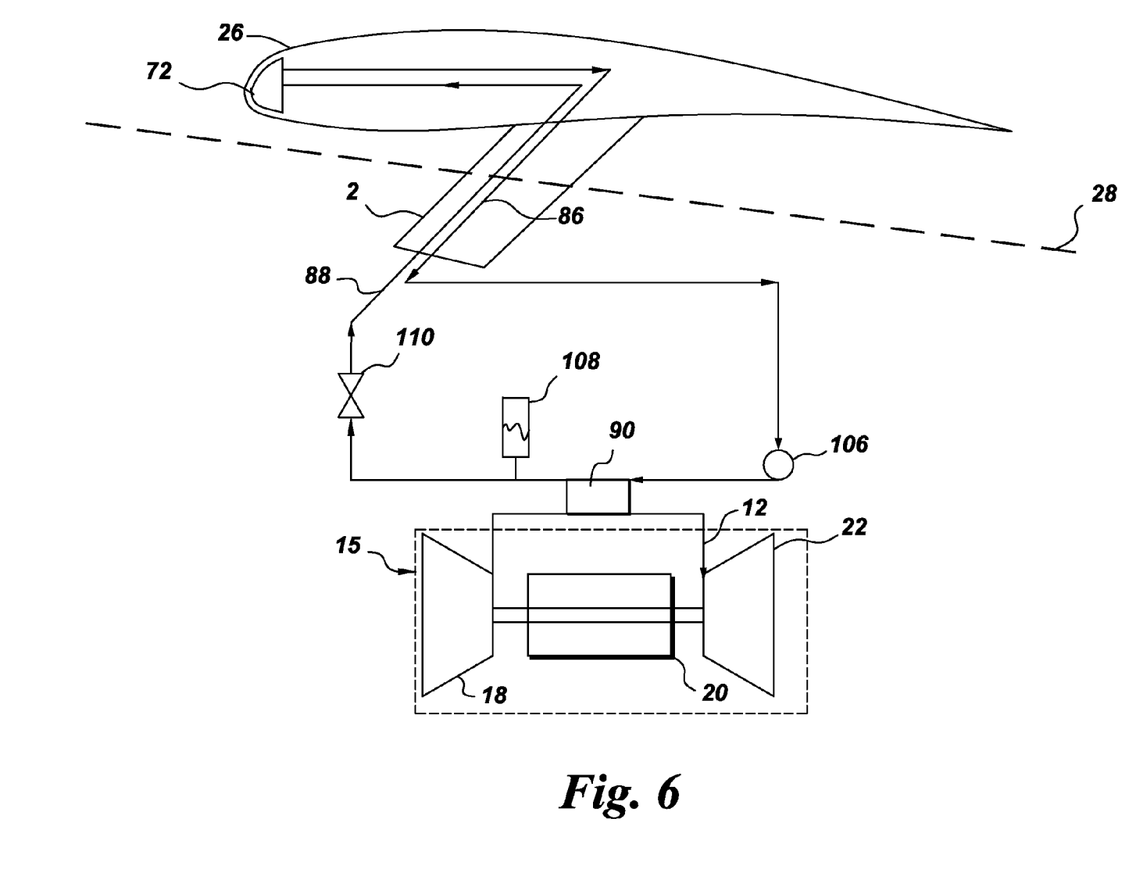
FIG. 6 is a cross-sectional illustration of a RFAC system for a turbine engine according to one example of the present technology.

Referring to FIG. 6, in a return fluid air cooler system according to another example, a cold synthetic thermal fluid 86 that does not undergo a phase change is supplied to a heat exchanger 90 configured to cool the high pressure turbine cooling air 12. The warm synthetic thermal fluid 88 from the heat exchanger 90 is provided to an anti-ice system 72 provided in the wing 26 of the aircraft. The cold synthetic thermal fluid 86 may be provided to the heat exchanger 90 by a pump 106 that may be switched on during take-off and climb of the aircraft and turned off during cruise conditions. An expansion bottle 108 may be provided after the heat exchanger 90 and a valve 110 may be provided to control the flow of the warm fluid 88. As discussed above, it should be appreciated that the thermal fluid may be, for example, water. The RFAC system of FIG. 6 does not include an intermediate loop, as in some previous examples, which is an advantage in weight savings.

Figure 7:
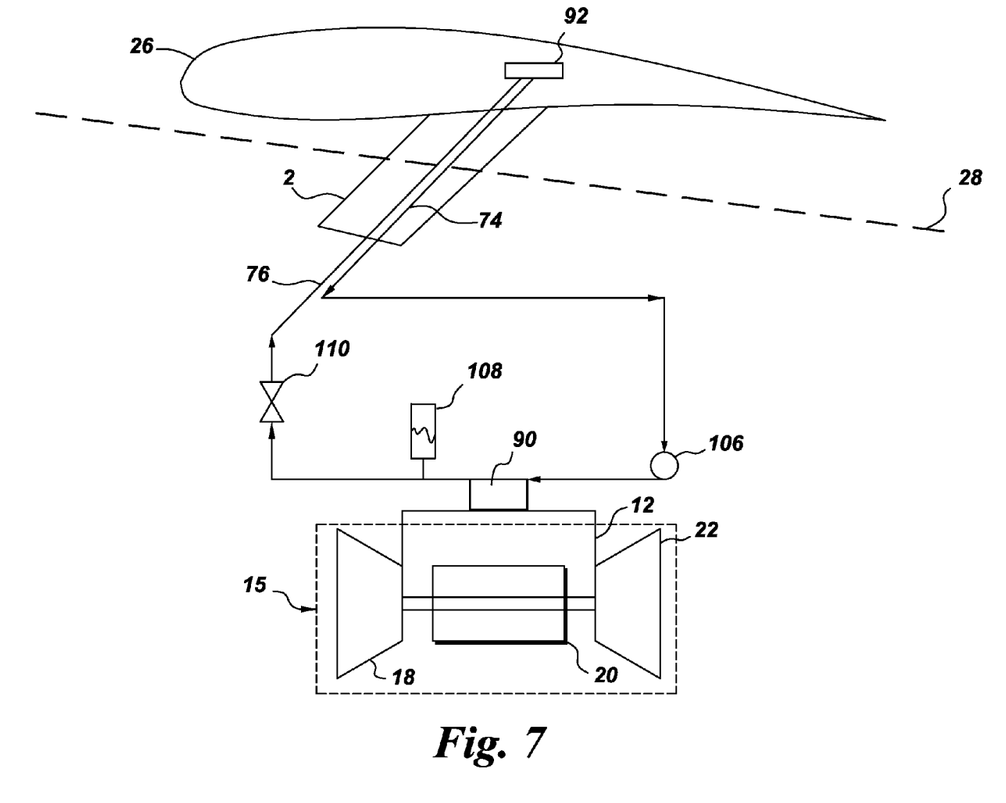
FIG. 7 is a cross-sectional illustration of a RFAC system for a turbine engine according to one example of the present technology.

Referring to FIG. 7, in a return fluid air cooler system according to another example, the cold synthetic thermal fluid 74 that does not undergo a phase change is provided to the heat exchanger 80 and the warm fluid 76 is returned to the tank or source 92. No power is extracted from the fluid. The system may be switched on during take-off and climb of the aircraft.

Figure 8:
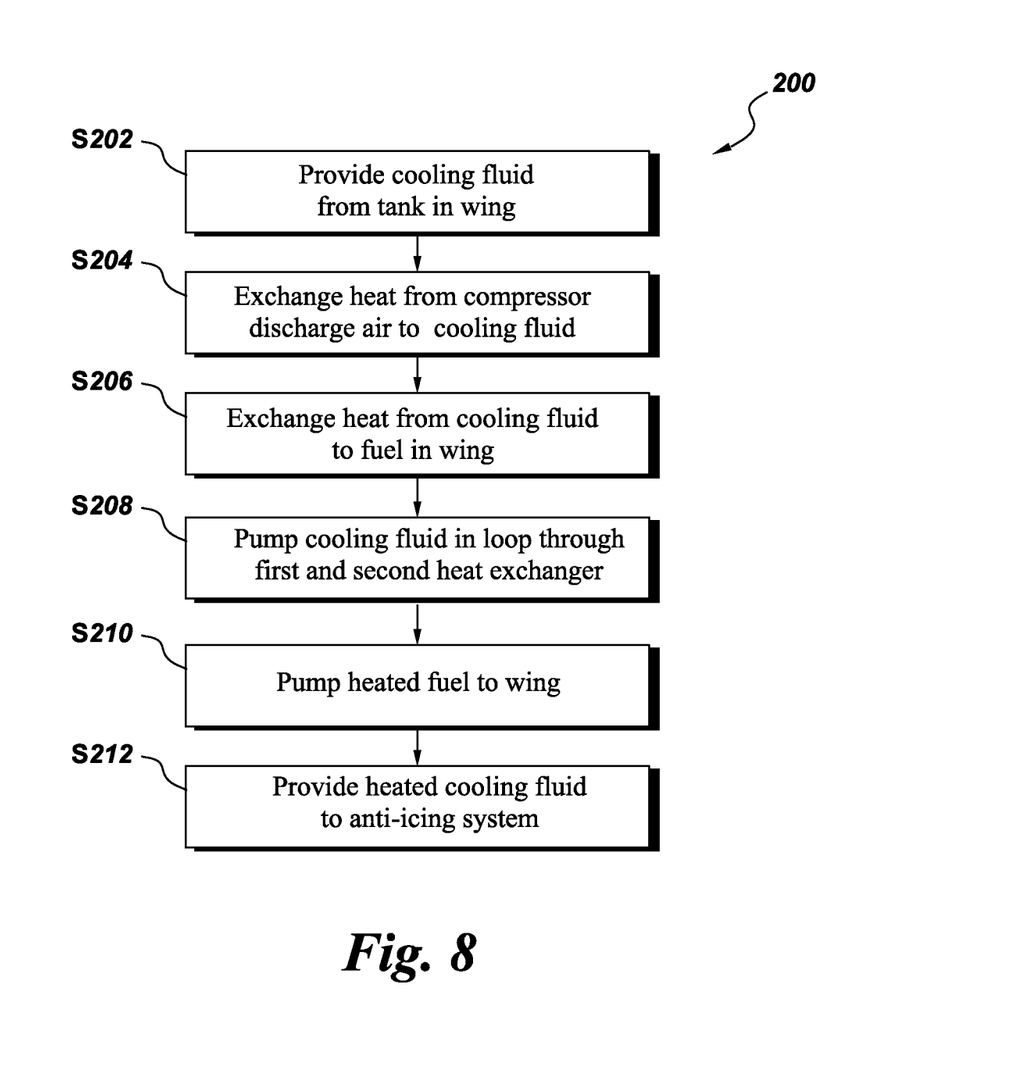
FIG. 8 is a flowchart schematically illustrating a method of cooling compressor discharge air provided to a turbine of a gas turbine engine of an aircraft.

Referring to FIG. 8, a method 200 of cooling compressor discharge air provided to a turbine of a gas turbine engine of an aircraft to cool the turbine or any other hot parts of the engine may include providing cooling fluid from a tank provided in a wing of the aircraft S202 and exchanging heat from the compressor discharge air to the cooling fluid with a heat exchanger provided in the gas turbine engine S204. The method may further include exchanging heat from the cooling fluid to fuel provided from the wing of the aircraft with a second heat exchanger provided in the gas turbine engine S206. The exchange of S206 may be provided by pumping the cooling fluid in a loop through the first and second heat exchangers in S208. The method may further include pumping the fuel heated by the second heat exchanger to the wing of the aircraft S210. The method may also further include providing the cooling fluid heated by the heat exchanger to an anti-icing system and/or a turbine of an electrical generator S212. As discussed above, the method may be performed during take-off and climb of the aircraft, and/or during de-icing of aerodynamic surfaces of the aircraft. The method may be discontinued during cruise of the aircraft, or during periods where de-icing is not required.

While only certain features of the present technology have been illustrated and described herein, many modifications and changes will occur to those skilled in the art. It is, therefore, to be understood that the appended claims are intended to cover all such modifications and changes.

What is claimed is:

1. In an aircraft including a gas turbine engine having a compressor and a turbine, a system for cooling compressor discharge air provided to the turbine to cool the turbine, the system comprising:
   a tank provided in a wing of the aircraft, the tank being configured to store a cooling fluid supply;
   a heat exchanger provided in the gas turbine engine configured to exchange heat from the compressor discharge air to the cooling fluid;
   an anti-icing system provided in the wing of the aircraft, wherein the cooling fluid heated by the heat exchanger is provided to the anti-icing system;
   a second turbine; and
   a generator connected to the second turbine configured to generate electrical power, wherein at least a portion of the cooling fluid heated by the heat exchanger is provided to rotate the second turbine.

2. A system according to claim 1, further comprising:
   a second heat exchanger configured to exchange heat from the cooling fluid to fuel provided from the wing of the aircraft.

3. A system according to claim 1, further comprising:
   a pump configured to pump the cooling fluid in a loop through the heat exchangers.

4. A system according to claim 2, further comprising:
a pump configured to pump the fuel heated by the second heat exchanger to the wing of the aircraft.

5. A system according to claim 3, wherein the pump is configured to pump the cooling fluid during at least one of take-off and climb of the aircraft and to not pump the cooling fluid during cruise of the aircraft.

6. A system according to claim wherein the cooling fluid is fuel.

7. A system according to claim 1, wherein the cooling fluid undergoes a phase change when heated by the heat exchanger.

8. A system according to claim 1, wherein the cooling fluid is water.

9. A method of cooling compressor discharge air provided to a turbine of a gas turbine engine of an aircraft to cool the turbine, the method comprising:
providing cooling fluid from a tank provided in a wing of the aircraft;
exchanging heat from the compressor discharge air to the cooling fluid with a heat exchanger provided in the gas turbine engine;
providing the cooling fluid heated by the heat exchanger to an anti-icing system provided in the wing and/or a tail of the aircraft; and
providing at least a portion of the cooling fluid heated by the heat exchanger to a second turbine to rotate an electrical generator.

10. A method according to claim 9, further comprising:
exchanging heat from the cooling fluid to fuel provided from the wing of the aircraft with a second heat exchanger provided in the gas turbine engine.

11. A method according to claim 10, further comprising:
pumping the cooling fluid in a loop through the heat exchangers.

12. A method according to claim 10, further comprising:
pumping the fuel heated by the second heat exchanger to the wing of the aircraft.

13. A method according to claim 10, wherein the cooling fluid is pumped in a loop through the heat exchangers during at least one of take-off and climb of the aircraft and not during cruise of the aircraft.

14. A method according to claim 9, wherein the cooling fluid is fuel.

15. A method according to claim 9, wherein the cooling fluid undergoes a phase change when heated by the heat exchanger.

16. A method according to claim 9, wherein the cooling fluid is water.

* * * * *